(12) United States Patent
Nakaoka

(10) Patent No.: US 8,823,851 B2
(45) Date of Patent: Sep. 2, 2014

(54) IMAGE CAPTURING APPARATUS AND CONTROL METHOD FOR IMAGE CAPTURING APPARATUS

(75) Inventor: Hiroshi Nakaoka, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 13/595,248

(22) Filed: Aug. 27, 2012

(65) Prior Publication Data

US 2013/0063642 A1 Mar. 14, 2013

(30) Foreign Application Priority Data

Sep. 9, 2011 (JP) ................................. 2011-197682

(51) Int. Cl.
*H04N 5/335* (2011.01)
*H04N 5/369* (2011.01)
*H04N 5/232* (2006.01)

(52) U.S. Cl.
CPC ............. *H04N 5/335* (2013.01); *H04N 5/3696* (2013.01); *H04N 5/23251* (2013.01)
USPC ............................ 348/308; 348/295; 348/349

(58) Field of Classification Search
CPC ... H04N 5/2329; H04N 5/2353; H04N 5/335; H04N 5/341; H04N 5/23212
USPC .................. 348/308, 394, 295, 296, 345, 349
See application file for complete search history.

(56) References Cited

U.S. PATENT DOCUMENTS

| | | | |
|---|---|---|---|
| 7,663,680 B2* | 2/2010 | Hashimoto et al. | 348/301 |
| 2009/0086063 A1* | 4/2009 | Suzuki et al. | 348/241 |
| 2009/0190021 A1* | 7/2009 | Nitta et al. | 348/308 |
| 2010/0013969 A1* | 1/2010 | Ui | 348/294 |
| 2011/0176042 A1* | 7/2011 | Kato et al. | 348/294 |
| 2011/0181747 A1* | 7/2011 | Kido et al. | 348/222.1 |

FOREIGN PATENT DOCUMENTS

JP 2007-325139 12/2007

* cited by examiner

*Primary Examiner* — Sinh Tran
*Assistant Examiner* — Zhenzhen Wu
(74) *Attorney, Agent, or Firm* — Cowan, Liebowitz & Latman, P.C.

(57) ABSTRACT

An image capturing apparatus comprises an optical system, an image sensor having pixels each including a plurality of photoelectric converters capable of outputting image signals independently, a driving unit which controls driving of the image sensor, a focus detection unit, and an addition unit which adds the output image signals on a per-pixel basis. In each pixel, the photoelectric converters are divided into groups each including at least two photoelectric converters and a charge accumulation period for one group is delayed from and partially overlaps a charge accumulation period for another. The driving unit drives the image sensor so that image signals are read from the groups in turn, and the focus detection unit detects a focus state using a phase difference method based on the read image signals independently output from the photoelectric converters.

10 Claims, 15 Drawing Sheets

F I G. 11
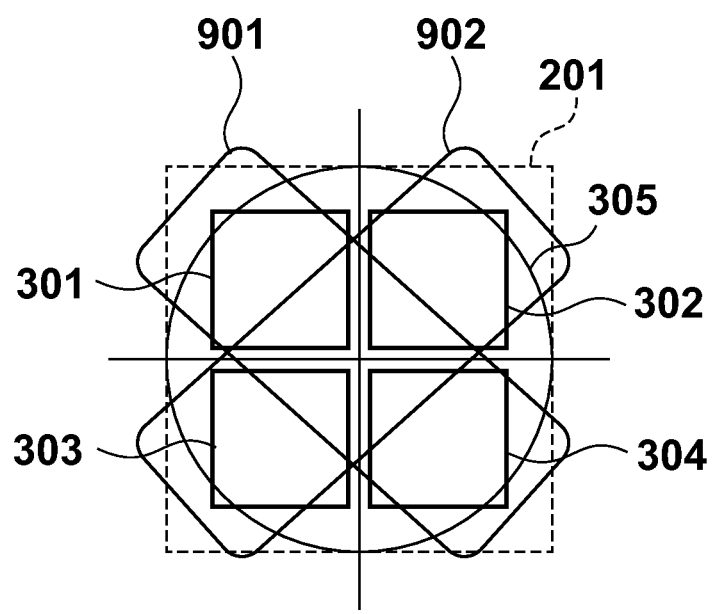

F I G. 14
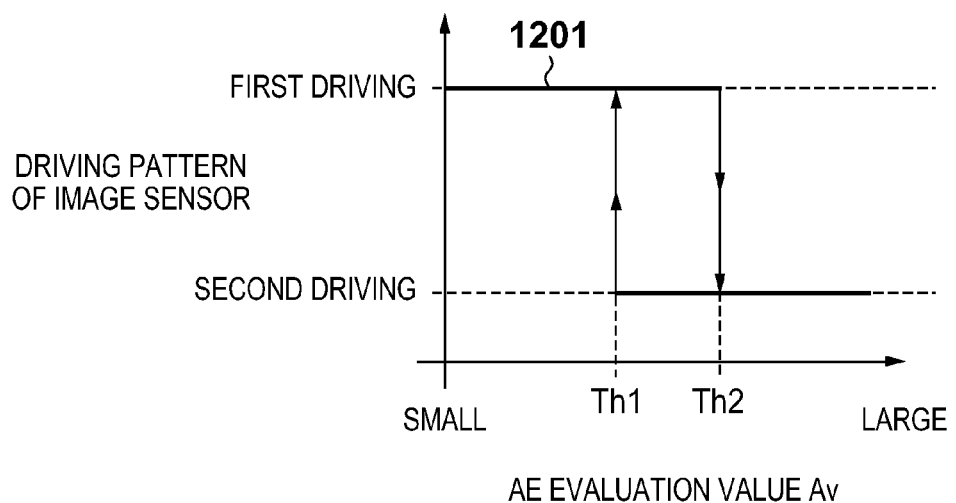

ID_CAPTURING APPARATUS AND
CONTROL METHOD FOR IMAGE
CAPTURING APPARATUS

BACKGROUND OF THE INVENTION

1. Field of the Invention

The present invention relates to an image capturing apparatus and a control method for the image capturing apparatus. In particular, the present invention relates to an image capturing apparatus that uses an image sensor composed of pixel units each provided with one microlens and a plurality of photoelectric converters and that achieves a focus detection function using a phase difference method, and to a control method for the image capturing apparatus.

2. Description of the Related Art

There are conventional techniques to acquire a signal for focus detection and an image signal for recording with the use of one image sensor (for example, see Japanese Patent Laid-Open No. 2007-325139). In an image capturing apparatus described in Japanese Patent Laid-Open No. 2007-325139, a plurality of photoelectric converters are arranged under one microlens. This image capturing apparatus conducts focus detection in accordance with a phase difference method using a signal acquired in response to luminous fluxes that have passed through areas of different exit pupils, and generates an image signal using the acquired signal. In this way, a signal for focus detection and an image signal for recording can both be acquired using one image sensor.

However, the technique described in Japanese Patent Laid-Open No. 2007-325139 has the following problems. Although signals for phase difference detection can be acquired by reading signals separately from the plurality of photoelectric converters, the acquired signals need to be added in order to generate the image signal. This addition increases the amount of noise and worsens the S/N ratio of the image signal. Furthermore, as the number of photoelectric converters provided for one microlens increases, the S/N ratio worsens.

In addition, Japanese Patent Laid-Open No. 2007-325139 describes switching between combinations of signals to be added among the photoelectric converters. However, there is a limitation on the combinations of signals to be added, thus resulting in the problem of reduced flexibility.

SUMMARY OF THE INVENTION

The present invention has been made in consideration of the above situation, and with the use of an image capturing apparatus that uses an image sensor comprised of a plurality of pixels each having a plurality of photoelectric converters, the present invention achieves a focus detection function using the phase difference method and improves the S/N ratio while maintaining the output rate of a video signal.

According to the present invention, provided is an image capturing apparatus comprising: an optical system configured to form an image of a subject; an image sensor that includes a plurality of pixels each having a plurality of photoelectric converters and that is capable of outputting image signals independently from the plurality of photoelectric converters, the plurality of photoelectric converters respectively receiving a plurality of luminous fluxes that have passed through areas of different exit pupils of the optical system; a driving unit configured to control driving of the image sensor; a focus detection unit configured to conduct focus detection using a phase difference method based on the image signals independently output from the plurality of photoelectric converters in the image sensor; and an addition unit configured to add the image signals independently output from the plurality of photoelectric converters in the image sensor on a per-pixel basis, wherein in each pixel, the plurality of photoelectric converters are divided into a plurality of groups each including at least two photoelectric converters, a charge accumulation period for one group is delayed from and partially overlaps a charge accumulation period for another, the driving unit drives the image sensor with first driving whereby image signals are read in order from each of the plurality of groups in a cyclic fashion, and the focus detection unit detects a focus state based on the image signals read through the first driving.

According to the present invention, provided is a control method for an image capturing apparatus including an optical system configured to form an image of a subject and an image sensor that includes a plurality of pixels each having a plurality of photoelectric converters and that is capable of outputting image signals independently from the plurality of photoelectric converters, the plurality of photoelectric converters respectively receiving a plurality of luminous fluxes that have passed through areas of different exit pupils of the optical system, the control method comprising: a driving step of driving the image sensor so that the plurality of photoelectric converters in each pixel are divided into a plurality of groups each including at least two photoelectric converters, a charge accumulation period for one group is delayed from and partially overlaps a charge accumulation period for another, and image signals are read in order from each of the plurality of groups in a cyclic fashion; a focus detection step of performing focus detection using a phase difference method based on the image signals read through the first driving; and an addition step of adding the read image signals on a per-pixel basis.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 11 is a schematic diagram showing a combination of photoelectric converters from which signals are read at the timings for the operation of reading signals shown in FIGS. 10A and 10B;

FIG. 14 is a diagram showing timing to switch between methods for driving the image sensor according to the second embodiment;

DESCRIPTION OF THE EMBODIMENTS

Exemplary embodiments of the present invention will be described in detail in accordance with the accompanying drawings.

<First Embodiment>

Figure 1:
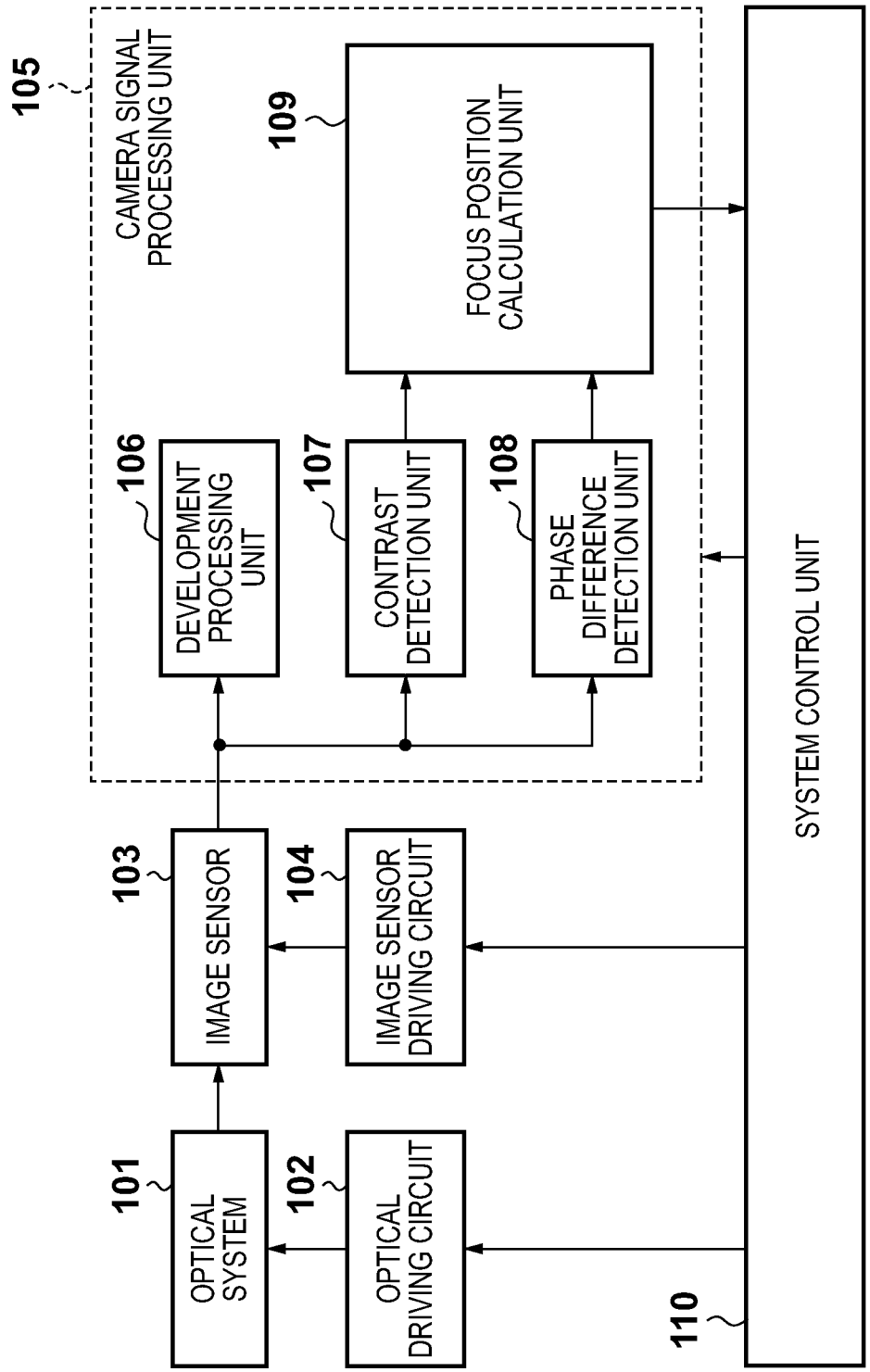
FIG. 1 is a block diagram showing a schematic configuration of an image capturing apparatus according to a first embodiment.

FIG. 1 is a block diagram showing a schematic configuration of an image capturing apparatus according to the first embodiment. In FIG. 1, 101 denotes an optical system composed of at least one of a zoom lens, diaphragm and focus lens, and 102 denotes an optical driving circuit that controls the optical system 101 in accordance with drive information for the optical system 101 output from a system control unit 110, which will be described later.

Also, 103 denotes an image sensor that photoelectrically converts an image of the subject formed by the optical system 101 into an electrical signal and outputs the electrical signal as an image signal, and 104 denotes an image sensor driving circuit that controls the image sensor 103 in accordance with drive information for the image sensor 103 output from the system control unit 110, which will be described later. When the image sensor 103 has an electronic shutter function, a control signal output from the image sensor driving circuit 104 makes possible the control for ensuring a time period required for exposure.

105 denotes a camera signal processing unit and includes a development processing unit 106, a contrast detection unit 107, a phase difference detection unit 108, and a focus position calculation unit 109. The development processing unit 106 executes image processing such as color conversion, white balance correction, gamma correction, resolution conversion processing, image compression processing, and the like on the image signal acquired from the image sensor 103. The contrast detection unit 107 acquires a contrast evaluation value from the image signal. The phase difference detection unit 108 detects, from the image signal, a phase difference evaluation value for executing focus control of phase difference method. Based on the contrast evaluation value acquired from the contrast detection unit 107 and the phase difference evaluation value, the focus position calculation unit 109 calculates focus control information for controlling the position of the focus lens in the optical system 101.

110 denotes the system control unit that controls the entirety of the image capturing apparatus, and transmits the drive information for the optical system 101 to the optical driving circuit 102 based on the focus control information acquired from the focus position calculation unit 109.

Figure 2:
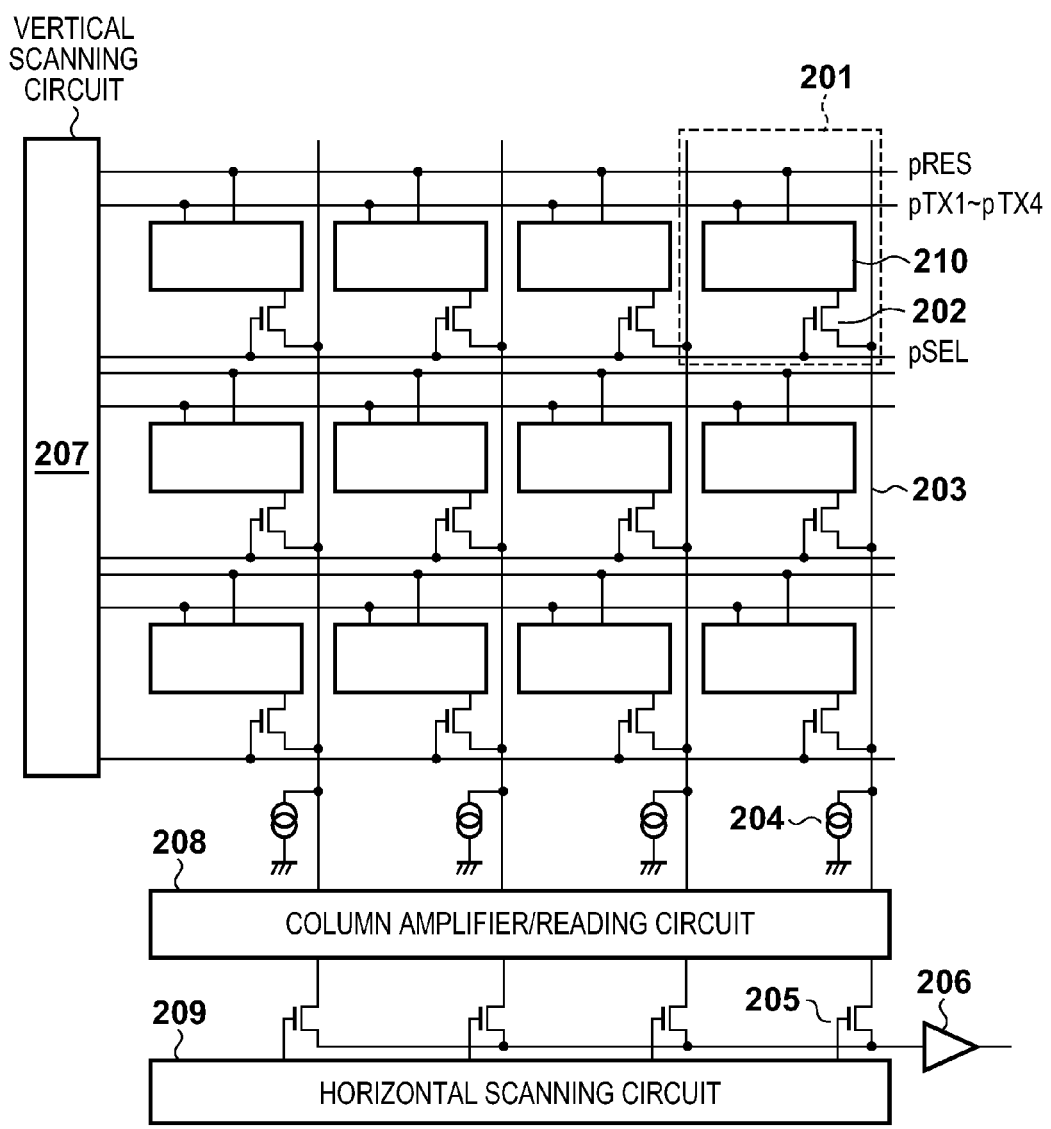
FIG. 2 is a schematic diagram showing a configuration of an image sensor according to the first embodiment.
Figure 3:
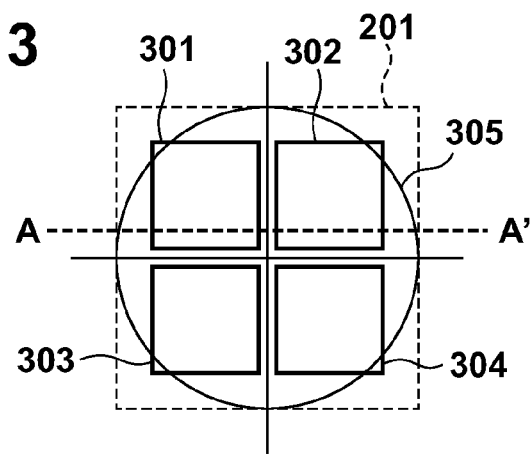
FIG. 3 is a schematic top view of one pixel unit included in the image sensor according to the first embodiment.
Figure 4:
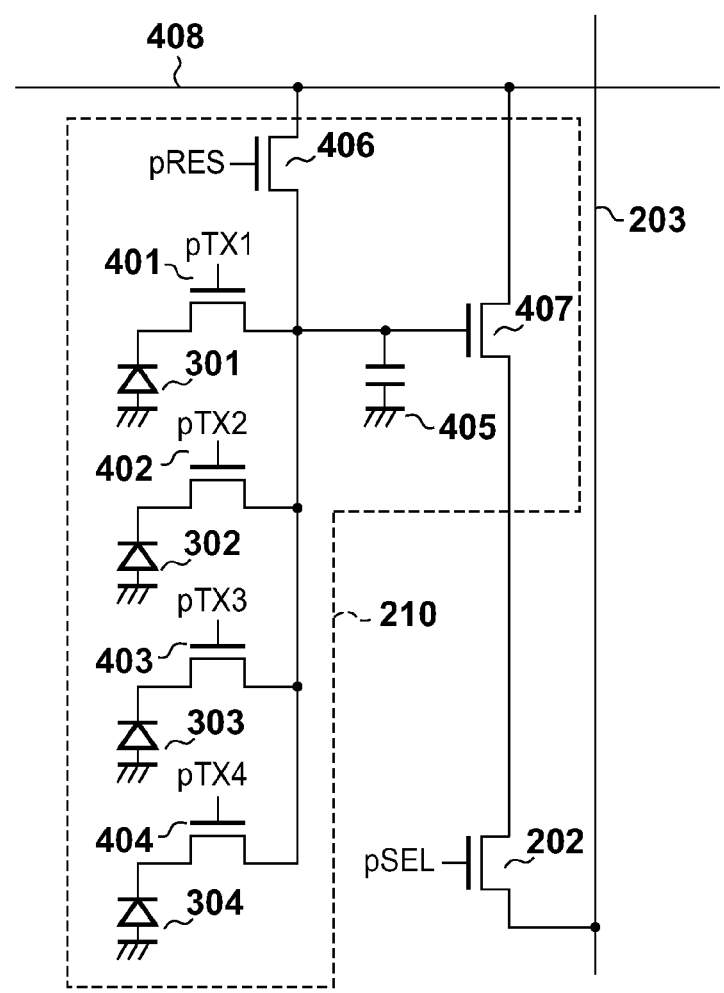
FIG. 4 is a circuit diagram of the pixel unit shown in FIG. 2.

A description is now given of the configuration of the image sensor 103 according to the first embodiment with reference to FIGS. 2, 3 and 4. The image sensor 103 according to the first embodiment is an X-Y address type image sensor, such as a CMOS image sensor. FIG. 2 shows pixel units arranged in three rows and four columns to facilitate the explanation. In practice, however, hundreds of thousands to tens of millions of pixel units are normally arranged.

Reference numeral 201 denotes a pixel unit. In the actual image sensor, a plurality of pixel units 201 are arranged in two dimensions at a predetermined aspect ratio. Each individual pixel unit 201 may be covered with a color filter exhibiting one of the hues of R, G and B. For example, color filters of R, G and B may be arrayed in accordance with the Bayer arrangement. 202 denotes a selection switch that selects a pixel unit 201 using a selection pulse pSEL.

FIG. 3 is a schematic top view of a pixel unit 201 composed of a plurality of photoelectric converters, such as photodiodes, for example, that convert light incident thereon into charge. FIG. 3 shows an example in which the pixel unit 201 is composed of four photoelectric converters 301, 302, 303 and 304 that share one microlens 305. Note that the other pixel units included in the image sensor 103 are each composed of four photoelectric converters having the positional relationship shown in FIG. 3.

FIG. 4 is a circuit diagram of the pixel unit 201 shown in FIG. 2. Note that the constituent elements of FIG. 4 that are common to FIGS. 2 and 3 have the same reference signs thereas. Reference numeral 405 denotes a floating diffusion unit (hereinafter, "FD") that serves as an accumulation area in which charges created in the photoelectric converters 301 to 304 are temporarily accumulated. 401, 402, 403 and 404 denote transfer switches that transfer the charges created in the photoelectric converters 301 to 304 to the FD 405 using transfer pulses pTX1 to pTX4.

Furthermore, 406 denotes a reset switch that removes the charges accumulated in the FD 405 using a reset pulse pRES, and 407 denotes a MOS amplifier that functions as a source follower. Gate electrodes of the transfer switches 401 to 404, the reset switch 406, and the selection switch 202 are respectively connected to signal lines that supply pTX1 to pTX4, pRES, and pSEL in units of rows, and are selected and scanned by a vertical scanning circuit 207 shown in FIG. 2. The reset switch 406 and the MOS amplifier 407 are connected to a power source line 408. By turning on the transfer pulses pTX1 to pTX4 in sequence, the charges in the photoelectric converters 301 to 304 can be read independently. Furthermore, by turning on a plurality of the transfer pulses pTX1 to pTX4 simultaneously, the charges in the photoelectric converters 301 to 304 connected to the transfer switches 401 to 404 in the on-state can be added and read. When the charges are read independently, the acquired image signals are added by the camera signal processing unit 105 on a per-pixel basis, and are subjected to various types of processing in the development processing unit 106.

Returning to FIG. 2, 204 denotes a fixed current source that serves as the load for the MOS amplifier 407. The pixel unit 201 and the fixed current source 204 are connected to a column amplifier/reading circuit 208 via a signal output line 203 in units of columns. The FD 405, the MOS amplifier 407, and the fixed current source 204 constitute a floating diffusion amplifier. The signal charge of the pixel unit selected by the selection switch 202 is converted to voltage and then output to the column amplifier/reading circuit 208 via the signal output line 203.

205 denotes an output selection switch that is driven by a horizontal scanning circuit 209 and selects a signal to be output from the column amplifier/reading circuit 208, and 206 denotes an output amplifier that outputs the signal output from the column amplifier/reading circuit 208 to the outside of the image sensor 103.

Note that although FIG. 2 shows an exemplary configuration in which single-channel reading is performed, it is possible to have a configuration in which multiple-channel reading is performed to accelerate the reading speed. For example, it is possible to have a configuration in which the reading circuits and the horizontal scanning circuits are provided for two channels so as to conduct the reading operation separately in odd-numbered columns and even-numbered columns, or in the left side and the right side of the screen. It goes without saying that three or more channels may be defined.

Figure 5A:
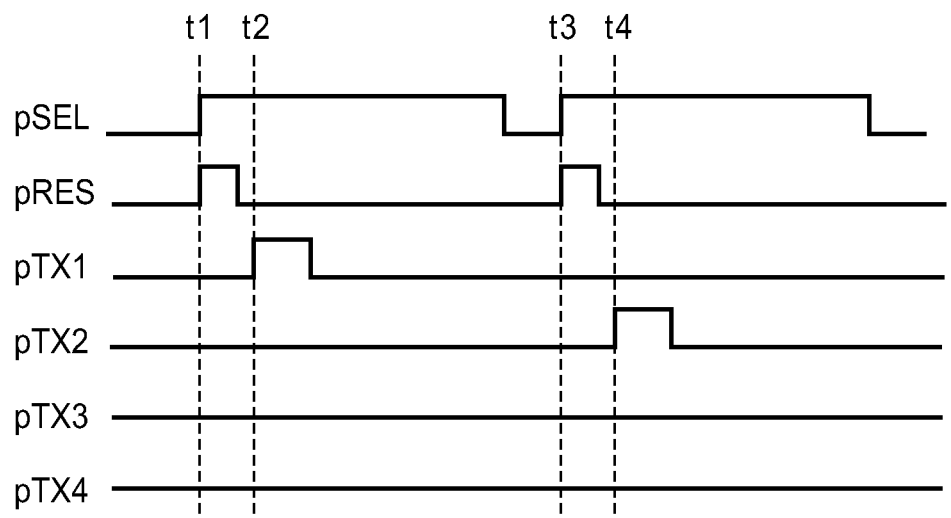
FIGS. 5A and 5B are timing charts showing timings for reading signals from pixel units included in the image sensor according to the first embodiment.
Figure 5B:
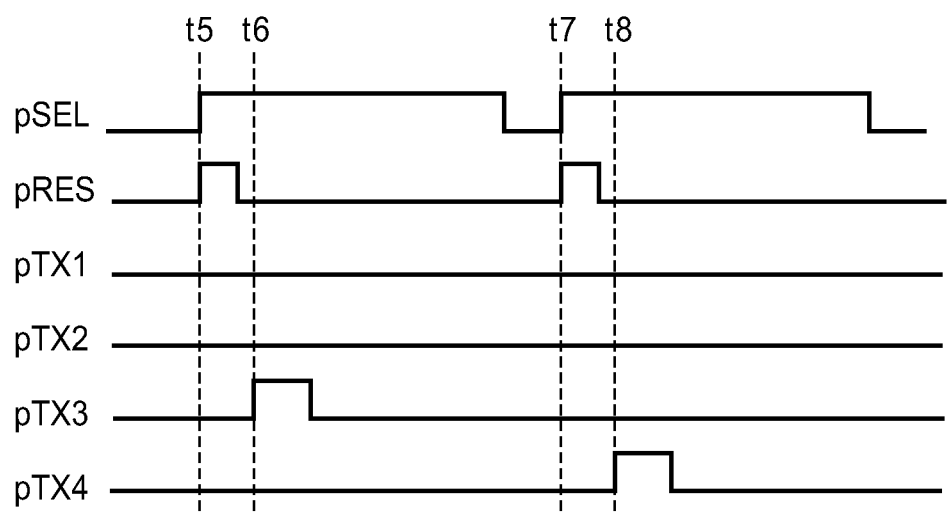
Figure 6:
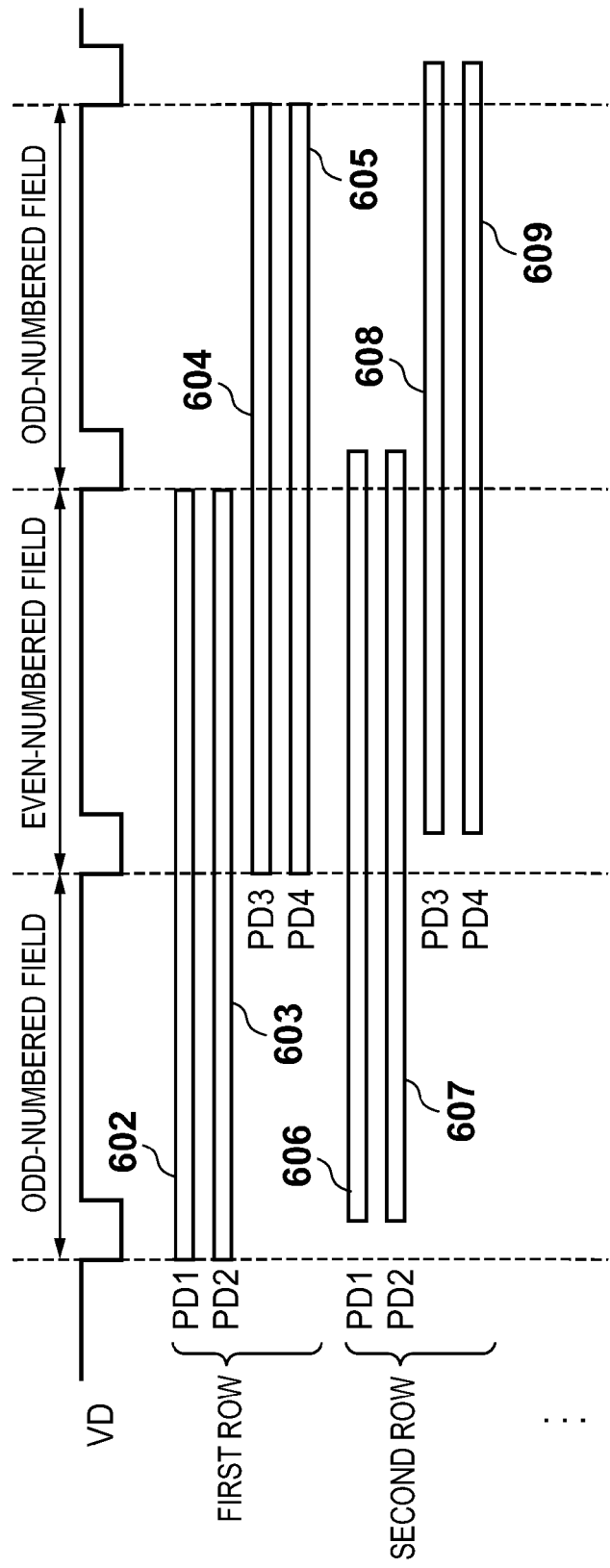
FIG. 6 is a timing chart showing timings for operations of accumulating charges and reading signals in the first and second rows of the image sensor according to the first embodiment.

The following describes operations of accumulating charges and reading signals executed in the image sensor 103 used in the first embodiment with reference to the timing charts of FIGS. 5A, 5B and 6.

In the image capturing apparatus described in the first embodiment, a period from one falling edge to the next falling edge of a vertical synchronization signal VD shown in FIG. 6 is defined to be a vertical synchronization period. For the sake of convenience, vertical synchronization periods are grouped into two types, namely odd-numbered fields and even-numbered fields. Odd-numbered fields and even-numbered fields alternate in a repeated manner. FIG. 5A is a timing chart showing the signal reading processing executed in the image sensor 103 for one row in an odd-numbered field.

In FIG. 5A, t1 shows a timing when the selection switch 202 of the row to be scanned is turned on using the selection pulse pSEL. The reset pulse pRES is turned on for a certain period of time to reset the FD 405 of the row to be read. After the FD 405 has been reset, the transfer pulse pTX1 is turned on for a certain period of time starting from t2, and the accumulated charge is read from the photoelectric converter 301 into the FD 405. The charge transferred to the FD 405 is converted into voltage by the configuration of the aforementioned floating diffusion amplifier and then output to the signal output line 203. Next, the selection switch 202 is turned on again at the timing of t3 so as to be prepared for reading charge from the next photoelectric converter. In a similar manner, the reset pulse pRES is turned on for a certain period of time starting from t3 so as to reset the FD 405 again for discharge. After the FD 405 has been reset, the transfer pulse pTX2 is turned on for a certain period of time starting from t4, and the accumulated charge is read from the photoelectric converter 302 into the FD 405. The charge transferred to the FD 405 is converted into voltage by the configuration of the aforementioned floating diffusion amplifier and then output to the signal output line 203. After the signals have been read from the photoelectric converters 301 and 302, the next row is selected without transferring charges from the other photoelectric converters 303 and 304. Following that, the charges are similarly transferred from the photoelectric converters 301 and 302 in the pixel units of each row, and signal outputs are obtained in sequence.

FIG. 5B is a timing chart showing the signal reading processing executed in the image sensor 103 for one row in an even-numbered field. The timings differ from the timings for reading signals in the odd-numbered field in that the charges are transferred from the photoelectric converters 303 and 304 from which signals were not read in the odd-numbered field.

In FIG. 5B, t5 shows a timing when the selection switch 202 of the row to be scanned is turned on using the selection pulse pSEL. The reset pulse pRES is turned on for a certain period of time to reset the FD 405 of the row to be read. After the FD 405 has been reset, the transfer pulse pTX3 is turned on for a certain period of time starting from t6, and the accumulated charge is read from the photoelectric converter 303 to the FD 405. The charge transferred to the FD 405 is converted into voltage by the configuration of the aforementioned floating diffusion amplifier and then output to the signal output line 203. Next, the selection switch 202 is turned on again at the timing of t7 so as to be prepared for reading charge from the next photoelectric converter. In a similar manner, the reset pulse pRES is turned on for a certain period of time starting from t7 so as to reset the FD 405 again for discharge. After the FD 405 has been reset, the transfer pulse pTX4 is turned on for a certain period of time starting from t8, and the accumulated charge is read from the photoelectric converter 304 to the FD 405. The charge transferred to the FD 405 is converted into voltage by the configuration of the aforementioned floating diffusion amplifier and then output to the signal output line 203. After the signals have been read from the photoelectric converters 303 and 304, the next row is selected without transferring charges from the other photoelectric converters 301 and 302. Following that, the charges are similarly transferred from the photoelectric converters 303 and 304 in the pixel units of each row, and signal outputs are obtained in sequence.

FIG. 6 shows timings for operations of accumulating charges and reading signals in the first and second rows. Reference numeral 602 denotes a charge accumulation period for the photoelectric converter 301 in the first row, and 603 denotes a charge accumulation period for the photoelectric converter 302 in the first row. The image sensor 103 is driven as follows. In an odd-numbered field, charges are read only from the photoelectric converters 301 and 302 in the pixel units by repeating a row selection in sequence. In an even-numbered field, charges are continuously accumulated in the photoelectric converters 301 and 302 but are not read therefrom at all. The same goes for the second row onward. The image sensor 103 is driven as indicated by 606 and 607, where 606 denotes an accumulation period for the photoelectric converter 301 and 607 denotes an accumulation period for the photoelectric converter 302 in the first row. Furthermore, the image sensor 103 is driven such that the selection (reading) of all rows constituting the image sensor 103 is completed during one vertical synchronization period (during one odd-numbered field). The image sensor 103 is also driven as follows. In an even-numbered field, charges are read only from the photoelectric converters 303 and 304 in the pixel units by repeating a row selection in sequence. In an odd-numbered field, charges are continuously accumulated in the photoelectric converters 303 and 304 but are not read therefrom at all. In FIG. 6, 604 denotes an accumulation period for the photoelectric converter 303 in the first row, and 605 denotes an accumulation period for the photoelectric converter 304 in the first row. Charges are not read therefrom in the odd-numbered field. The same goes for the second row onward. The image sensor 103 is driven as indicated by 608 and 609, where 608 denotes an accumulation period for the photoelectric converter 303 and 609 denotes an accumulation period for the photoelectric converter 304 in the second row. Furthermore, the image sensor 103 is driven such that the selection (reading) of all rows constituting the image sensor 103 is completed during one vertical synchronization period (during one even-numbered field).

As set forth above, the operation of accumulating charges in the photoelectric converters 301 and 302 and reading the accumulated charges therefrom is executed from an odd-numbered field through an even-numbered field and repeated in a cycle of these two fields. On the other hand, the operation of accumulating charges in the photoelectric converters 303 and 304 and reading the accumulated charges therefrom is executed from an even-numbered field through an odd-numbered field and repeated in a cycle of these two fields. That is to say, each of the four photoelectric converters repeatedly accumulates charge over two fields. Furthermore, the four photoelectric converters are divided into two groups, and the timing for reading charges from one group is delayed by one field from the timing for reading charges from the other, so that the charge accumulation periods for one group partially overlap the charge accumulation periods for the other. In this way, an accumulation period extending over two fields can be secured for each photoelectric converter, and an image signal for detecting a phase difference, which will be described later, can be acquired on a per-field basis.

Figure 7:
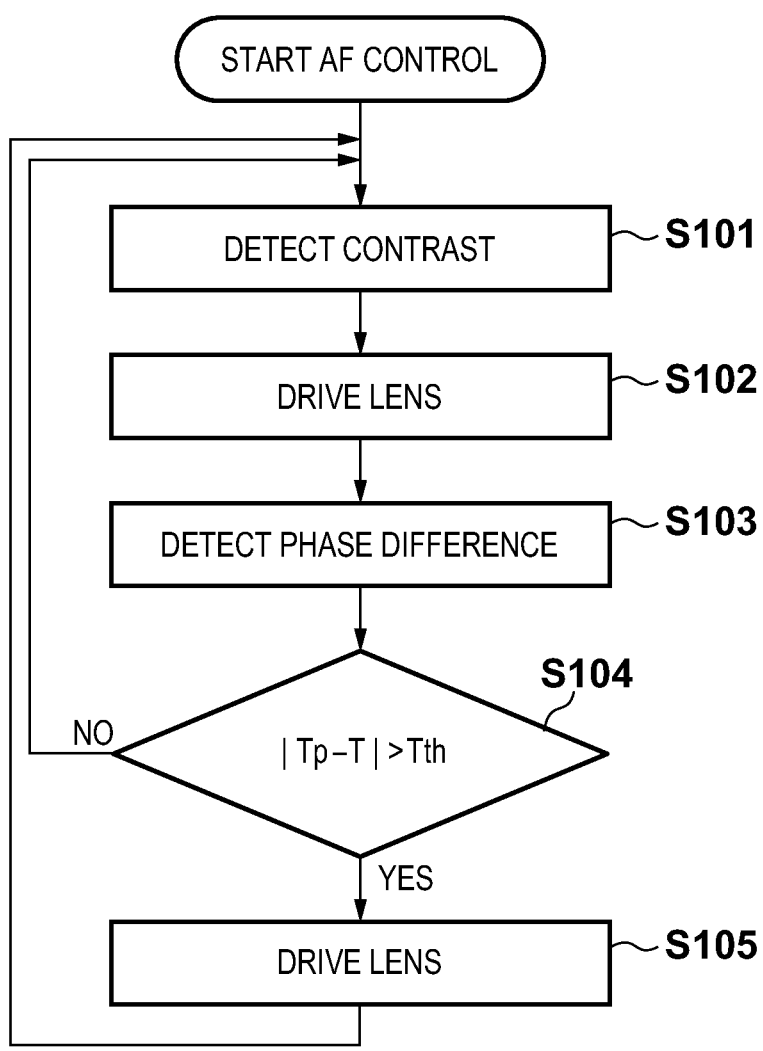
FIG. 7 is a flowchart showing processing for detecting the state of focus according to the first embodiment.
Figure 8:
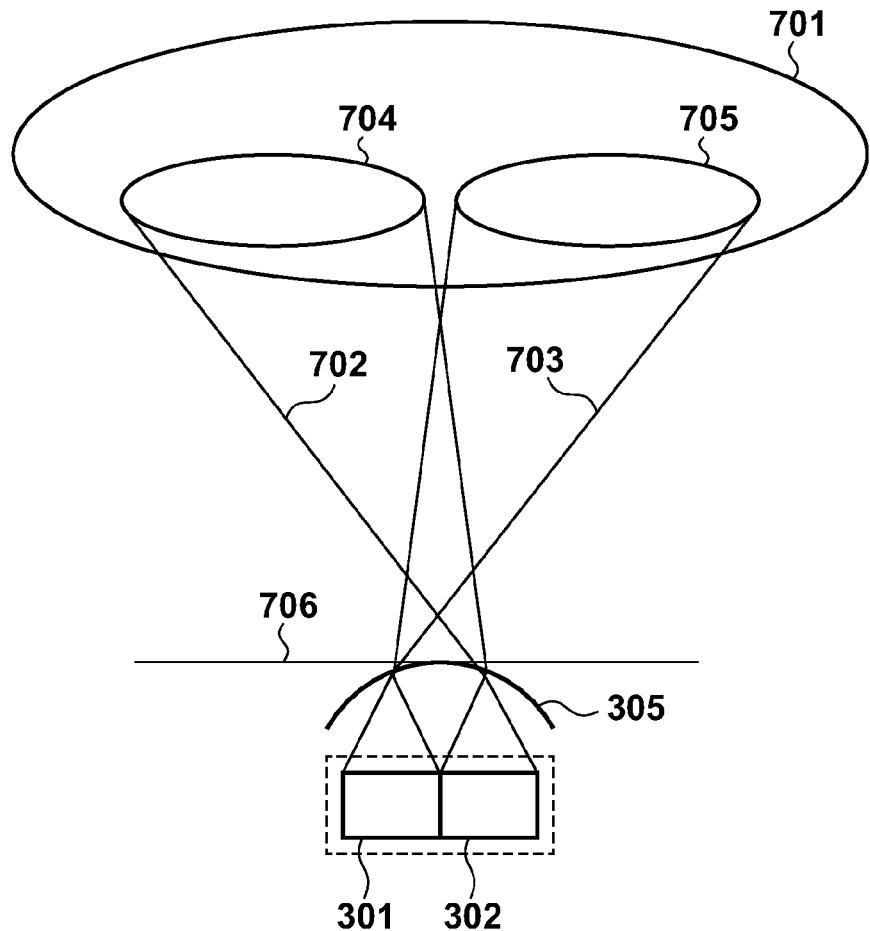
FIG. 8 is a schematic diagram showing a cross section of the image sensor with exit pupils of an optical system according to the first embodiment.
Figure 9:
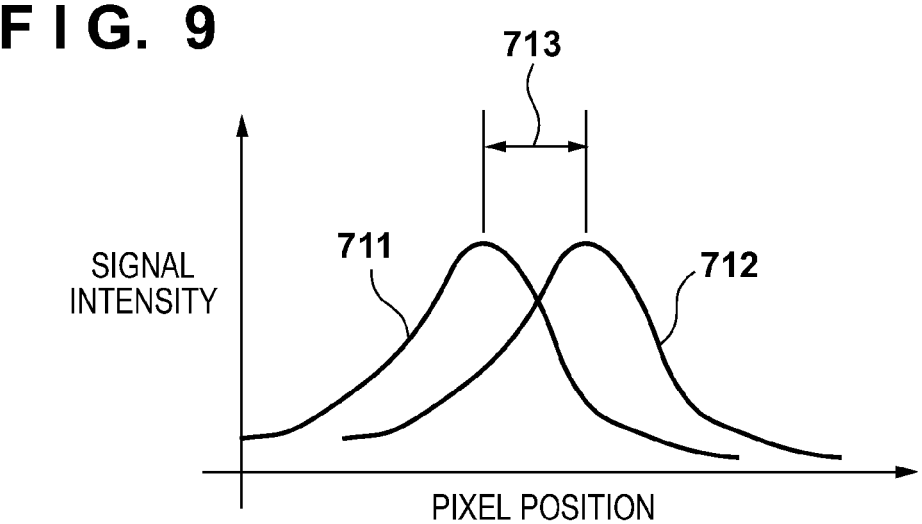
FIG. 9 is a schematic diagram showing images acquired from signals output from the image sensor according to the first embodiment.

A description is now given of processing for detecting the focus state from an image signal acquired from the image sensor 103 with reference to FIGS. 7, 8 and 9. FIG. 7 is a flowchart showing the entirety of processing for detecting the focus state in the first embodiment.

First, in step S101, the contrast detection unit 107 calculates a contrast evaluation value for detecting an in-focus state using image signals acquired from the image sensor 103. The contrast evaluation value is calculated by executing filter processing on the acquired image signals using a bandpass filter and cumulating the absolute values of the acquired filter outputs. However, a calculation method for the contrast evaluation value in the present invention is not limited to the above method, but may be any calculation method that brings about the largest contrast evaluation value for the subject in the in-focus state. In step S102, the focus position calculation unit 109 transmits, to the system control unit 110, focus control information that is necessary to drive the focus lens so as to maximize the contrast evaluation value acquired from the contrast detection unit 107, that is to say, so as realize the in-focus state. In general, the auto focus control using the aforementioned contrast evaluation value is called hill climbing.

In step S103, the phase difference detection unit 108 calculates information of a distance to the subject using a phase difference detection method based on the image signals acquired from the image sensor 103, and transmits the calculated information to the focus position calculation unit 109 as a phase difference evaluation value. The following describes the phase difference detection method with reference to FIG. 8.

FIG. 8 shows a schematic cross section taken along A-A' in FIG. 3. Reference numeral 701 denotes an exit pupil of an imaging lens included in the optical system 101 as viewed from the image. A distance from the image plane 706 of the imaging lens to the exit pupil 701 in the focus state is called an exit pupil position. The exit pupil position varies depending on, for example, curvatures of a group of lenses located behind the lens diaphragm (toward the image plane), not shown in the figures, and a positional relationship between the group of lenses and the diaphragm. It goes without saying that the size of the exit pupil 701 changes in accordance with the diameter of the diaphragm. Reference numerals 704 and 705 respectively denote exit pupils of the photoelectric converters 302 and 301 that are projected by the microlens 305 on the exit pupil position. It is designed so that luminous flux 703 passing through the exit pupil 705 is incident on the photoelectric converter 301, and it is designed so that luminous flux 702 passing through the exit pupil 704 is incident on the photoelectric converter 302.

Although FIG. 8 only illustrates the photoelectric converters 301 and 302, the photoelectric converters 303 and 304 shown in FIG. 3 are actually positioned toward the front side of FIG. 8. Luminous flux that has passed through the back left area of the exit pupil 701 of the imaging lens, not shown in the figures, is incident on the photoelectric converter 304, and Luminous flux that has passed through the back right area of the exit pupil 701 of the imaging lens, not shown in the figures, is incident on the photoelectric converter 303.

Provided that an image A is acquired from the photoelectric converters 302 in the pixel units of the image sensor 103 from the luminous flux 702, and that an image B is acquired from the photoelectric converters 303 in the pixel units of the image sensor 103 from the luminous flux 703, there is a phase difference between the image A and the image B depending on the focus state.

FIG. 9 shows one example of image signals acquired in a front focus state. Reference numeral 712 denotes the image A and 711 denotes the image B. According to the phase difference detection method, the information of the distance to the subject is calculated from a relative relationship between the image A 712 and image B 711, the distance 713 between these images, and the distance from the image plane to the exit pupil at the focus lens position. The phase difference detection unit 108 transmits the information of the distance to the subject calculated in the above manner to the focus position calculation unit 109 as the phase difference evaluation value.

Next, in step S104, the focus position calculation unit 109 determines whether or not an absolute value of a difference between the current focus lens position T and a target focus lens position Tp calculated from the phase difference evaluation value has exceeded a threshold value Tth. More specifically, the focus position calculation unit 109 determines whether or not the image is out of focus to the extent that the absolute value exceeds the threshold value Tth. If the absolute value is smaller than or equal to the threshold value Tth, the processing returns to step S102 and the focus detection processing is executed again through contrast detection. Note that the threshold value Tth may be determined in advance based on the index at which the image is assumed to be out of focus, or may be adjusted by the system control unit 110 in accordance with the condition of the subject. For example, when the imaging condition is such that the distance to the subject changes frequently, if the threshold value Tth is small, then the focus position fluctuates frequently, thus making the video hard to see. Such fluctuations can be restrained by setting the threshold value Tth to a large value.

If the absolute value of the difference between the current focus position T and the target focus position Tp is determined to be larger than the threshold value Tth in step S104, the processing moves to step S105. Then, the focus position calculation unit 109 transmits, to the system control unit 110, the focus control information necessary for driving the focus lens based on the target focus position Tp. Through the above-described flow, it is possible to realize a focus detection function using the contrast detection and the phase difference detection based on the image signals acquired from the image sensor 103. Although the above has described a procedure using the image signals acquired from the photoelectric converters 301 and 302 via the reading operation in the odd-numbered frame, similar processing is executed in the even-numbered frame as well.

The following describes a method for generating video signals from the image signals acquired from the image sensor 103. First, a description is given of how video signals are generated with conventional technologies. For the sake of convenience, the following description is given under the assumption that four photoelectric converters constitute a pixel unit. According to conventional technologies, one signal is acquired for each pixel by reading signals from all the four photoelectric converters included in the pixel unit 201 and adding the read signals. Alternatively, one signal is acquired for one pixel unit 201 by adding the charges in the photoelectric converters along the vertical direction in the pixel unit 201 of the image sensor 103, executing the aforementioned focus detection processing, and adding the charges along the horizontal direction. Provided that a signal amount acquired from one photoelectric converter during one vertical synchronization period is S, the value shown in the following Expression (1) can be obtained as a signal level of the generated video signal corresponding to one pixel.

$$S+S+S+S=4S \quad (1)$$

Here, provided that a noise amount created in one photoelectric converter during one vertical synchronization period (a random noise component independent of the amount of incident light) is N, the sum of noise amounts included in the generated video signal corresponding to one pixel equals the value shown in the following Expression (2).

$$\sqrt{N^2+N^2+N^2+N^2}=2N \quad (2)$$

On the other hand, based on a similar idea, when the image sensor 103 is driven using the driving method proposed by the present invention, the signal level of the video signal corresponding to one pixel equals the value shown in the following Expression (3), that is to say, the signal level of the conventional technologies can be achieved.

$$2 \times S + 2 \times S = 4S \quad (3)$$

In the first embodiment, during one field period (one vertical synchronization period), signals are acquired from two photoelectric converters (the photoelectric converters 301 and 302 in the case of the odd-numbered field shown in FIG. 6) out of the four photoelectric converters included in the pixel unit 201 of the image sensor 103. As the accumulation periods extend over two vertical synchronization periods, the sum of the acquired signal levels is the same as that of conventional technologies. On the other hand, the sum of the noise amounts included in the generated video signal corresponding to one pixel equals the sum of the noise amounts of two photoelectric converters, namely, the value shown in the following Expression (4), which is 3 dB lower in decibel notation.

$$\sqrt{N^2+N^2}=\sqrt{2}N \quad (4)$$

As has been described above, a plurality of photoelectric converters included in each pixel are divided into a plurality of groups. Signals are read from the photoelectric converters in order on a per-group basis while delaying the reading timing for one group from the reading timing for another. One video signal is acquired for each pixel by adding the read signals for each pixel. In this way, the focus detection function can be achieved using the phase difference method, and the S/N ratio of the video signal can be improved while maintaining the output rate of the video signal.

The first embodiment has described an example in which, in a plan view of the pixel unit 201, the photoelectric converters are vertically divided into two groups each including two photoelectric converters that horizontally adjacent to each other, and signals are read from the two groups alternately in every other field. However, similar effects can be achieved when the image sensor 103 is driven such that the photoelectric converters are horizontally divided into two groups each including two photoelectric converters that vertically adjacent to each other, and signals are read from the two groups alternately in every other field.

Figure 10A:
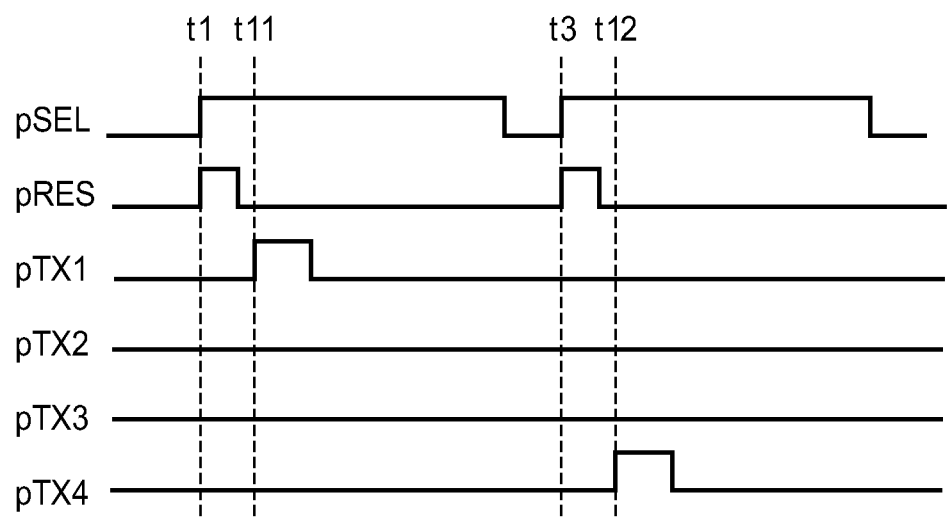
FIGS. 10A and 10B are timing charts showing another example of timings for operations of accumulating charges and reading signals in the first and second rows of the image sensor according to the first embodiment.
Figure 10B:
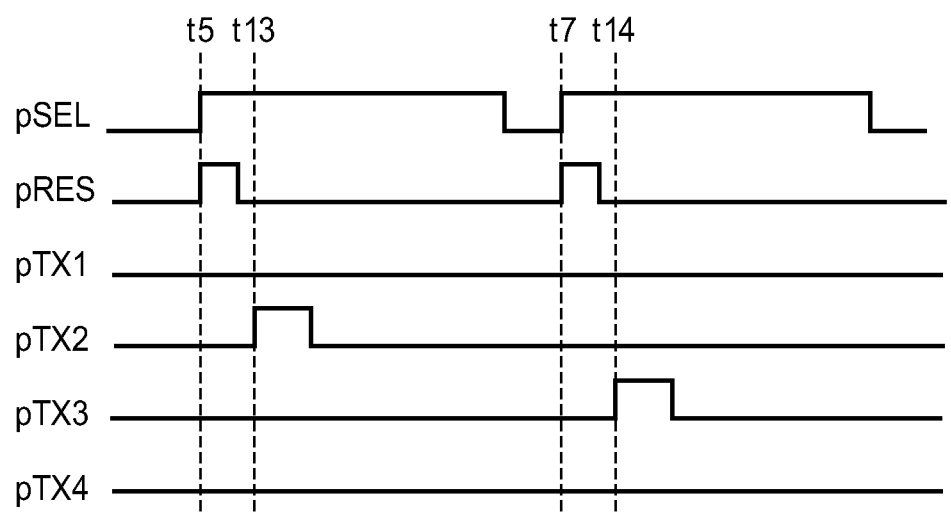

Furthermore, the photoelectric converters 301 to 304 may be driven as shown in FIGS. 10A and 10B. More specifically, in the odd-numbered field, the photoelectric converters 301 and 304 may be driven such that the charge is read from the photoelectric converter 301 at the timing of t11, and from the photoelectric converter 304 at the timing of t12. On the other hand, in the even-numbered field, the photoelectric converters 302 and 303 may be driven such that the charge is read from the photoelectric converter 302 at the timing of t13, and from the photoelectric converter 303 at the timing of t14. Note that t1, t3, t5, and t7 are the same as those shown in FIGS. 5A and 5B, and a description thereof is omitted. In this manner, among the photoelectric converters vertically and horizontally divided in each pixel unit, as groups 901 and 902 shown in FIG. 11, photoelectric converters diagonally arranged with the center of the pixel unit 201 therebetween may be paired, and signals may be read from the two groups alternately by every other field. It goes without saying that the phase difference detection can be conducted in this case as well. The advantage of this driving method is that, when generating a video signal, the barycentric position of the signal acquired through addition does not vary between the odd-numbered frame and the even-numbered frame. Therefore, this driving method makes it possible to easily generate video in which the phases of the subject match between the frames, even without correcting a shift in the barycenter of video signals acquired in the odd-numbered frame and the even-numbered frame.

Furthermore, although the first embodiment has described an example in which the pixel unit 201 includes four photoelectric converters (two in the vertical direction by two in the horizontal direction), the present invention is not limited in this way. The invention of the present application is applicable to a configuration in which the pixel unit 201 includes two or more photoelectric converters in both vertical and horizontal directions.

<Second Embodiment>

Figure 12:
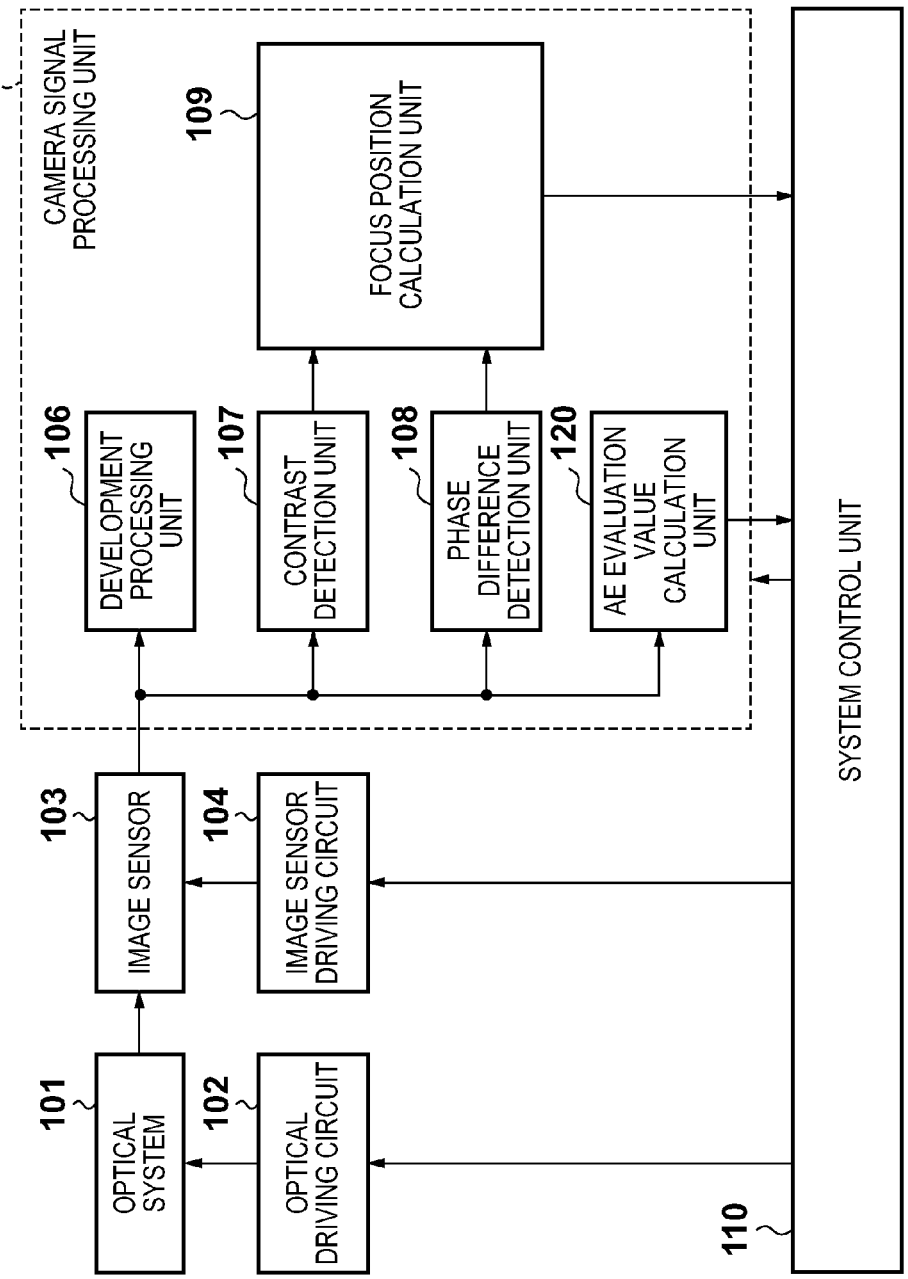
FIG. 12 is a block diagram showing a schematic configuration of an image capturing apparatus according to a second embodiment.

A description is now given of a second embodiment of the present invention. FIG. 12 is a block diagram showing a schematic configuration of an image capturing apparatus according to the second embodiment. Note that the constituent elements of FIG. 12 that are similar to those explained in the first embodiment with reference to FIG. 1 are given the same reference numbers thereas, and a description thereof is omitted. The feature of the second embodiment is that the driving of the image sensor 103 is switched in accordance with the brightness of the subject acquired from image signals and the imaging mode of the image capturing apparatus.

As shown in FIG. 12, an image capturing apparatus according to the second embodiment includes an AE evaluation value calculation unit 120 for acknowledging the brightness of the subject in addition to the constituent elements shown in FIG. 1. The AE evaluation value calculation unit 120 calculates a luminance level of the subject being imaged by the image capturing apparatus from an image signal acquired from the image sensor 103, and transmits the calculated luminance level to the system control unit 110 as an AE evaluation value. For example, in the case where the image sensor 103 is covered by color filters of three colors R, G and B, the luminance level can be calculated by executing an averaging process on R:G:B at a composition rate of 1:2:1 in accordance with the additive color mixture. Note that the equation used for the calculation is not limited to this. Alternatively, a generally-known RGB-luminance conversion equation may be used. It is widely known that, in the case where so-called complementary color filters of yellow, magenta, green and cyan are used in the image sensor 103, the luminance level can be calculated in the similar manner, and the present invention is applicable in this case as well. Based on the AE evaluation value acquired from the AE evaluation value calculation unit 120, the system control unit 110 transmits drive information necessary for driving the image sensor 103 to the image sensor driving circuit 104.

Figure 13:
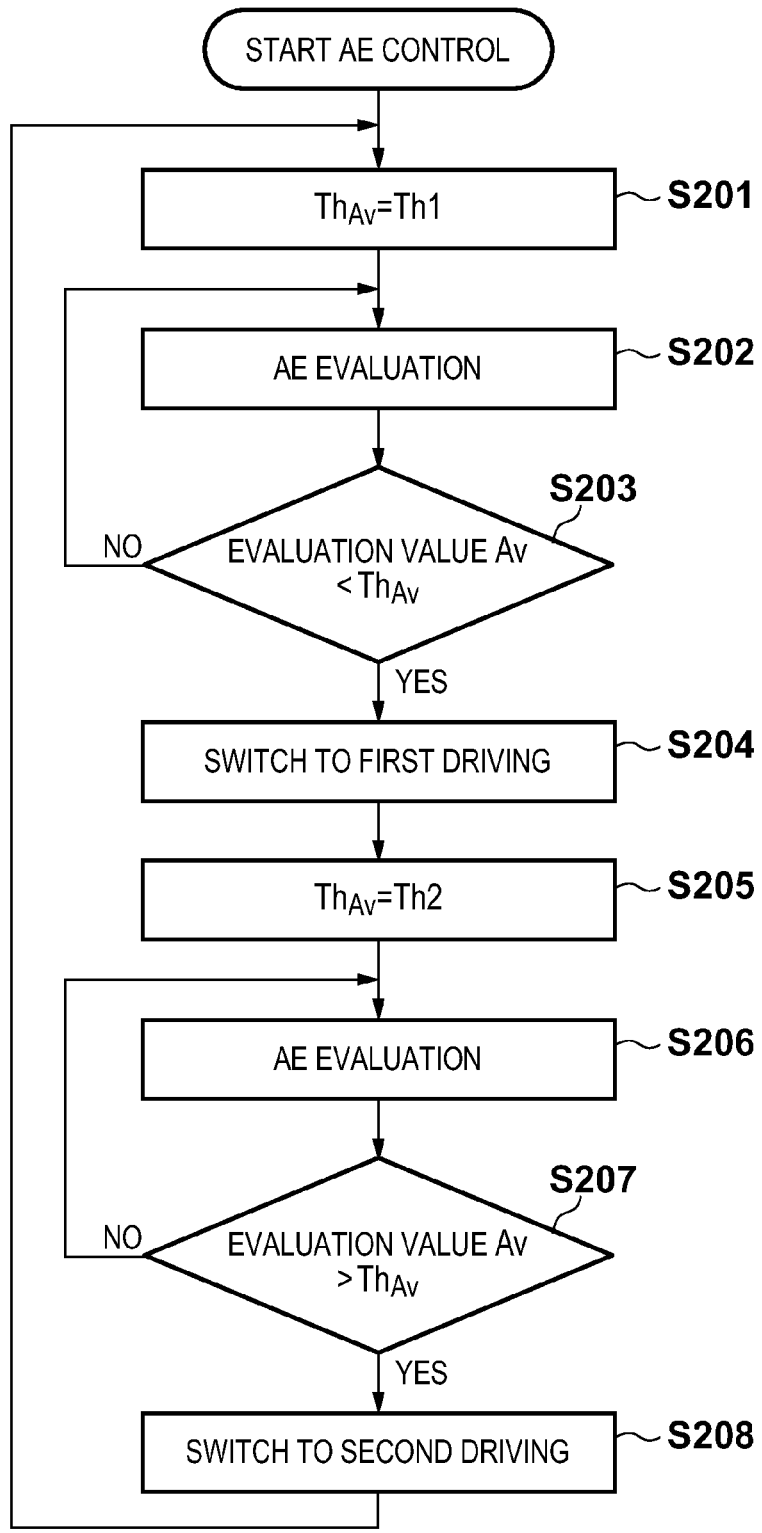
FIG. 13 is a flowchart showing control for switching between methods for driving an image sensor according to the second embodiment.

A description is now given of a procedure for switching between methods for driving the image sensor 103 in the second embodiment with reference to FIGS. 13 and 14. FIG. 13 is a flowchart of a method for switching the driving of the image sensor 103 based on the AE evaluation value acquired from the AE evaluation value calculation unit 120.

In step S201, a switch threshold value $Th_{Av}$ for determining a switch timing for the image sensor 103 is set. FIG. 14 shows a driving pattern of the image sensor 103 according to the AE evaluation value Av. Solid lines labeled 1201 indicate switching between methods for driving the image sensor 103 in accordance with the AE evaluation value Av. More specifically, the solid lines 1201 indicate switching between the first driving and the second driving in accordance with the AE evaluation value Av. The first driving denotes the driving according to the present invention described in the first embodiment, whereas the second driving denotes the driving according to conventional technologies whereby signals are read in a cyclic fashion from all the photoelectric converters. Th1 denotes a switch threshold value for the case where the AE evaluation value Av is declining. Conversely, Th2 denotes a switch threshold value for the case where the AE evaluation value Av is increasing. In step S201, Th1 is set as the switch threshold value $Th_{Av}$.

Next, in step S202, the AE evaluation value calculation unit 120 calculates the AE evaluation value Av. The following description is given under the assumption that the AE evaluation value calculation unit 120 calculates the AE evaluation value Av at a timing when the image signal is transmitted from the image sensor 103 (i.e. in a cycle of the vertical synchronization signal of the image capturing apparatus).

In step S203, the AE evaluation value Av is compared with the switch threshold value $Th_{Av}$, and if the AE evaluation value Av is greater than or equal to the switch threshold value $Th_{Av}$ while the second driving is in progress, the processing returns to step S202 in which the AE evaluation value calculation unit 120 calculates the AE evaluation value Av again after waiting for the next frame. If the AE evaluation value Av is smaller than the switch threshold value $Th_{Av}$, the processing moves to step S204. In step S204, the system control unit 110 transmits drive information for the image sensor 103 to the image sensor driving circuit 104 so that the image sensor 103 is driven with the aforementioned first driving, and the image sensor driving circuit 104 transmits a control signal to the image sensor 103.

Thereafter, in step S205, Th2 is set as the switch threshold value $Th_{Av}$. When the switch threshold value $Th_{Av}$ takes multiple values in the above manner, the driving of the image sensor 103 is not switched frequently even if the AE evaluation value Av fluctuates around the switch threshold value $Th_{Av}$. Therefore, smooth imaging can be realized.

In step S206, the AE evaluation value calculation unit 120 calculates the AE evaluation value Av. While the first driving is in progress, the AE evaluation value Av is compared with the switch threshold value $Th_{Av}$ in step S207. If the AE evaluation value Av is smaller than or equal to the switch threshold value $Th_{Av}$ while the first driving is in progress, the processing returns to step S206 in which the AE evaluation value calculation unit 120 calculates the AE evaluation value Av again after waiting for the next frame. If the AE evaluation value Av is greater than the switch threshold value $Th_{Av}$, the processing moves to step S208. In step S208, the system control unit 110 transmits drive information for the image sensor 103 to the image sensor driving circuit 104 so that the image sensor 103 is driven with the aforementioned second driving, and the image sensor driving circuit 104 transmits a control signal to the image sensor 103.

The above-described control achieves the following effects. When the AE evaluation value Av is large, that is to say, when the subject is in a sufficiently bright environment, signals are read from all the photoelectric converters in the image sensor 103 as in conventional technologies. The reason why the driving explained in the first embodiment is not used in this case is because the driving method according to the present invention extends the accumulation period for each photoelectric converter in the image sensor 103 to obtain signal levels. That is to say, as the accumulation period for each photoelectric converter is longer than that of conventional technologies, motion blur caused by movement of the subject during the accumulation period is prominent. On the other hand, when the AE evaluation value Av is small, that is to say, when the subject is imaged in a dark environment, the S/N ratio of the picture signal can be improved by using the driving method of the present invention. The feature of the second embodiment is that the performance of the image capturing apparatus is further improved by appropriately switching between driving methods, that is to say, between the driving method of conventional technologies and the driving method of the present invention, in accordance with the condition of the subject.

The second embodiment has described the control in which the condition of the subject is determined based on the image signal acquired from the image sensor 103. However, similar effects can be achieved without using the image signal by switching the driving of the image sensor 103 in accordance with, for example, the gain settings and shutter speed (charge accumulation period) of the image capturing apparatus and the diaphragm of the optical system 101. In this case, it is thought that the luminance of the subject is lower for the larger gain settings, slower shutter speed, or smaller F value of the diaphragm, and therefore the control shown in FIG. 14 may be executed based on these values.

<Third Embodiment>

Figure 15:
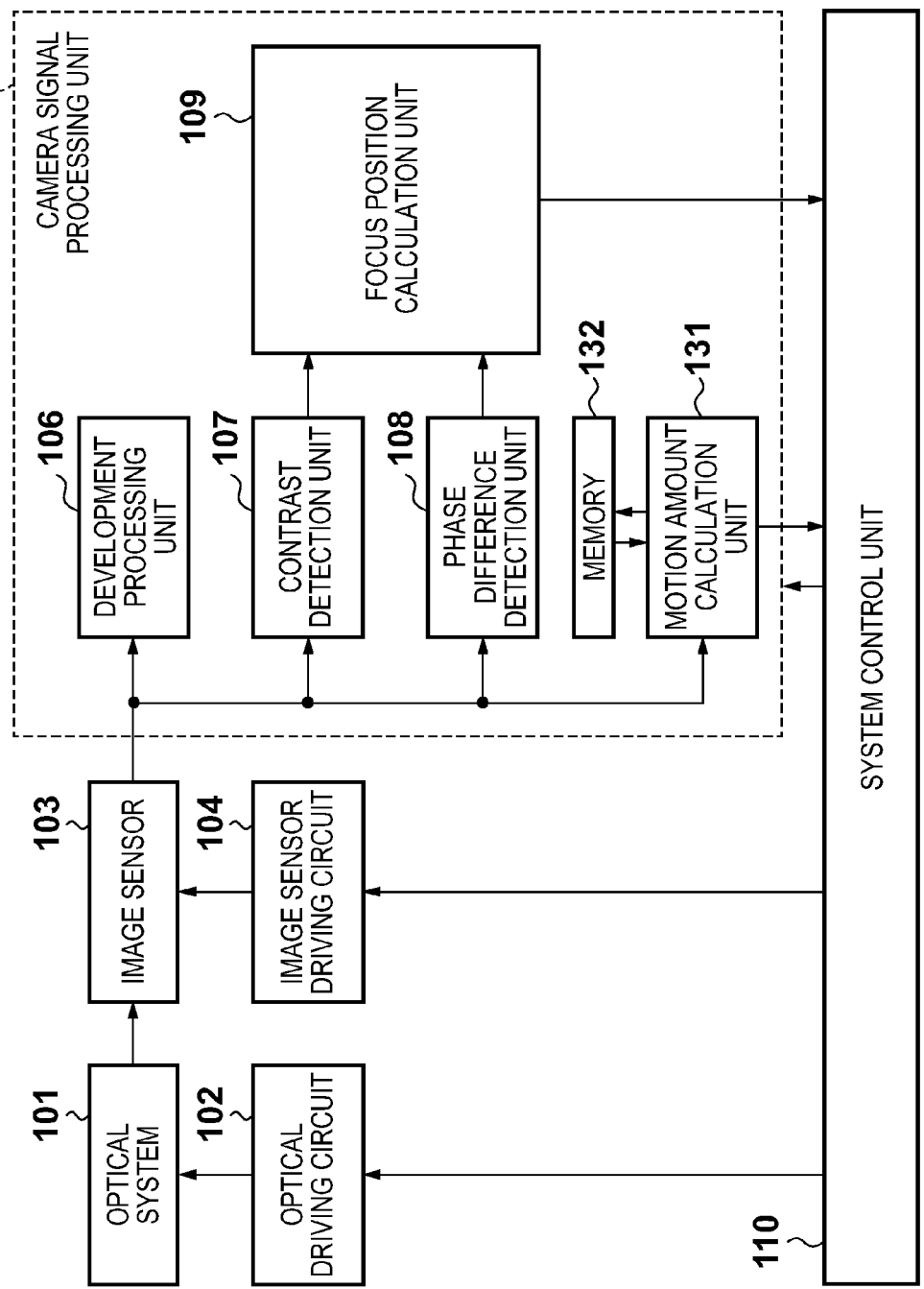
FIG. 15 is a block diagram showing a schematic configuration of an image capturing apparatus according to a third embodiment.

A description is now given of a third embodiment of the present invention. FIG. 15 is a block diagram showing a schematic configuration of an image capturing apparatus according to the third embodiment. Note that the constituent elements of FIG. 15 that are similar to those explained in the first embodiment with reference to FIG. 1 are given the same reference numbers thereas, and a description thereof is omitted. The feature of the third embodiment is that the driving of the image sensor 103 is switched in accordance with the motion amount of the subject and the motion amount of the image capturing apparatus itself acquired from an image signal.

In FIG. 15, a motion amount calculation unit 131 is provided as means for acknowledging the motion amount of the subject. The motion amount of the subject being imaged by the image capturing apparatus is calculated from the image signal acquired from the image sensor 103, and the calculated motion amount is transmitted to the system control unit 110 as a motion amount evaluation value. A memory 132 is for storing an image signal corresponding to one frame and stores the image signal to be input to the motion amount calculation unit 131. The motion amount calculation unit 131 executes correlation calculation (matching processing) on the image signal corresponding to the previous frame stored in the memory 132 and the input image signal. In the correlation calculation, the absolute value of the sum of differences between the levels of pixels in the both image signals is calculated while shifting in the two-dimensional direction, and the shift amount that brings about the smallest absolute value of the sum is output to the system control unit 110 as the motion amount evaluation value indicating the motion amount of the subject observed from the image signals.

In the present invention, the method of correlation calculation used by the motion amount calculation unit 131 is not limited to the aforementioned method. For example, it is widely known to execute correlation calculation after binarizing the image signals to black and white in advance according to the signal levels. In this way, the motion amount evaluation value can be obtained by storing the binarized signal values in the memory 132 instead of the image signal as described above, and executing similar correlation calculation with the use of the binarized signal values. The system control unit 110 transmits drive information necessary for driving the image sensor 103 to the image sensor driving circuit 104 based on the motion amount evaluation value acquired from the motion amount calculation unit 131.

Figure 16:
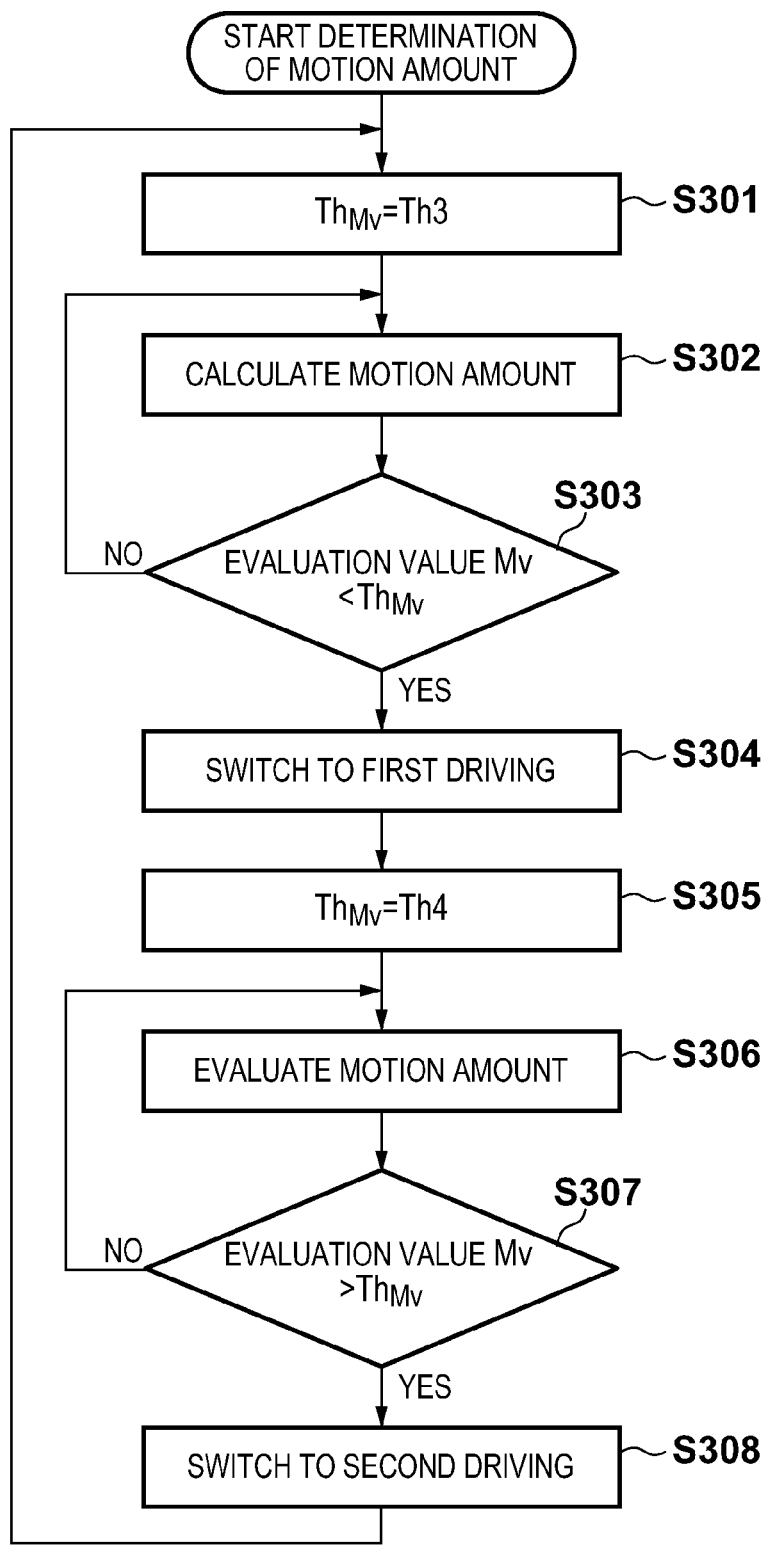
FIG. 16 is a flowchart showing control for switching between methods for driving an image sensor according to the third embodiment.
Figure 17:
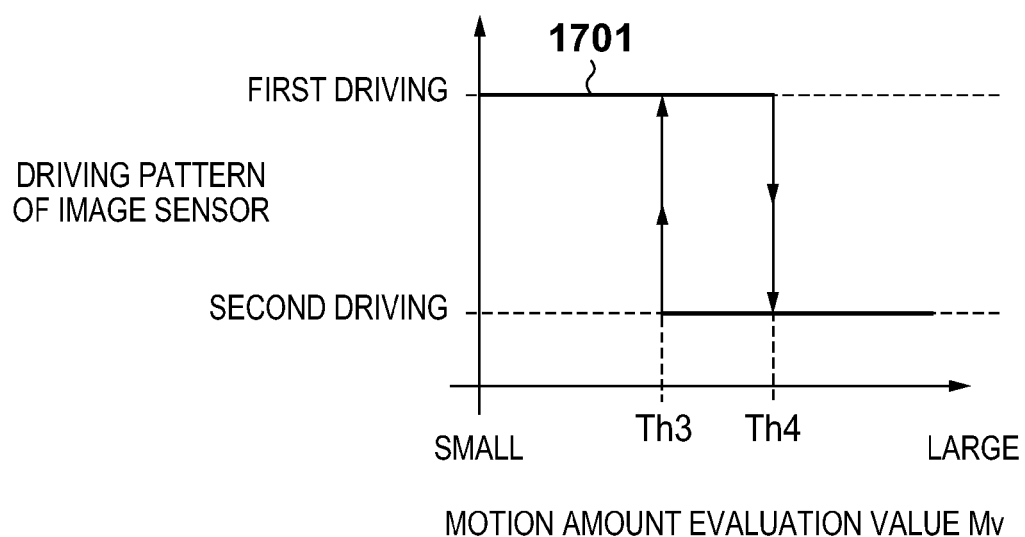
FIG. 17 is a diagram showing timing to switch between methods for driving the image sensor according to the third embodiment.

The following describes timing to switch between methods for driving the image sensor 103 in third embodiment with reference to FIGS. 16 and 17. FIG. 16 is a flowchart showing a method for switching the driving of the image sensor 103 based on the motion amount evaluation value acquired from the motion amount calculation unit 131.

In S301, a switch threshold value $Th_{Mv}$ for determining a switch timing for the image sensor 103 is set. FIG. 17 shows a driving pattern of the image sensor 103 according to the motion amount evaluation value Mv. Solid lines labeled 1701 indicate switching between methods for driving the image sensor 103 in accordance with the motion amount evaluation value Mv. More specifically, the solid lines 1701 indicate switching between the first driving and the second driving in accordance with the motion amount evaluation value Mv. The first driving denotes the driving according to the present invention described in the first embodiment, whereas the second driving denotes the driving according to conventional technologies whereby signals are read from all the photoelectric converters. Th3 denotes a switch threshold value for the case where the motion amount evaluation value Mv is declining. Conversely, Th4 denotes a switch threshold value for the case where the motion amount evaluation value Mv is increasing. In S301, Th3 is set as the switch threshold value $Th_{Mv}$.

Next, in S302, the motion amount calculation unit 131 calculates the motion amount evaluation value Mv. The following description is given under the assumption that the motion amount calculation unit 131 calculates the motion amount evaluation value Mv at a timing when the image signal is transmitted from the image sensor 103 (i.e. in a cycle of the vertical synchronization signal of the image capturing apparatus).

In S303, the motion amount evaluation value Mv is compared with the switch threshold value $Th_{Mv}$, and if the motion amount evaluation value Mv is greater than or equal to the switch threshold value $Th_{Mv}$, the processing returns to S302 in which the motion amount calculation unit 131 calculates the motion amount evaluation value Mv again after waiting for the next frame. If the motion amount evaluation value Mv is smaller than the switch threshold value $Th_{Mv}$ while the second driving is in progress, the processing moves to S304. In S304, the system control unit 110 transmits drive information for the image sensor 103 to the image sensor driving circuit 104 so that the image sensor 103 is driven with the aforementioned first driving, and the image sensor driving circuit 104 transmits a control signal to the image sensor 103.

Thereafter, in step S305, Th4 is set as the switch threshold value $Th_{Mv}$. When the switch threshold value $Th_{Mv}$ takes multiple values in the above manner, the driving of the image sensor 103 is not switched frequently even if the motion amount evaluation value Mv fluctuates around the switch threshold value $Th_{Mv}$. Therefore, smooth imaging can be realized.

In S306, the motion amount calculation unit 131 calculates the motion amount evaluation value Mv. In S307, the motion amount evaluation value Mv is compared with the switch threshold value $Th_{Mv}$, and if the motion amount evaluation value Mv is smaller than or equal to the switch threshold value $Th_{Mv}$, the processing returns to S306 in which the motion amount calculation unit 131 calculates the motion amount evaluation value Mv again after waiting for the next frame. If the motion amount evaluation value Mv is greater than the switch threshold value $Th_{Mv}$ while the first driving is in progress, the processing moves to S308. In S308, the system control unit 110 transmits drive information for the image sensor 103 to the image sensor driving circuit 104 so that the image sensor 103 is driven with the aforementioned second driving, and the image sensor driving circuit 104 transmits a control signal to the image sensor 103.

The above-described control achieves the following effects. When the motion amount evaluation value Mv is large, that is to say, when the subject is moving to a great extent, signals are read from all the photoelectric converters in the image sensor 103 as in conventional technologies. The reason why the driving explained in the first embodiment is not used in this case is because the driving method according to the present invention extends the accumulation period for each photoelectric converter in the image sensor 103 to obtain signal levels. That is to say, as the accumulation period for each photoelectric converter is longer than that of conventional technologies, motion blur caused by movement of the subject during the accumulation period is prominent. On the other hand, when the motion amount evaluation value Mv is small, that is to say, when the movement of the subject is small or the subject is still, the S/N ratio of the video signal can be improved by using the driving method of the present invention. The feature of the third embodiment is that the performance of the image capturing apparatus is further improved by appropriately switching between driving methods, namely, between the driving method of conventional technologies and the driving method of the present invention, in accordance with the condition of the subject.

The third embodiment has described the control in which the condition of the subject is determined based on the image signal acquired from the image sensor 103. However, it is possible to switch the driving of the image sensor 103 without using the image signal. For example, the motion amount (vibration amount) of the image capturing apparatus itself may be detected with the use of a vibration amount detection sensor such as a gyroscope mounted in the image capturing apparatus. Similar effects can be achieved by performing control to switch the driving of the image sensor 103 with reference to the detected motion amount.

Further, it is possible to combine the operation of the second embodiment and the third embodiment. Namely, the switching between the first driving and the second driving may be controlled based on the brightness of a subject and a motion amount by, for example, combining the evaluation values of brightness and the motion amount and setting the thresholds corresponding to Th1 or Th3 and T2 or T4 appropriately.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-197682, filed on Sep. 9, 2011 which is hereby incorporated by reference herein in its entirety.

What is claimed is:

1. An image capturing apparatus comprising:
an optical system configured to form an image of a subject;
an image sensor that includes a plurality of pixels each having a plurality of photoelectric converters and that is capable of outputting image signals independently from the plurality of photoelectric converters, the plurality of photoelectric converters respectively receiving a plurality of luminous fluxes that have passed through areas of different exit pupils of the optical system;
a driving unit configured to control driving of the image sensor;
a focus detection unit configured to conduct focus detection using a phase difference method based on the image signals independently output from the plurality of photoelectric converters in the image sensor; and
an addition unit configured to add the image signals independently output from the plurality of photoelectric converters in the image sensor on a per-pixel basis,
wherein in each pixel, the plurality of photoelectric converters are divided into a plurality of groups each including at least two photoelectric converters, a charge accumulation period for one group is delayed from and partially overlaps a charge accumulation period for another, the driving unit drives the image sensor with first driving whereby image signals are read from the plurality of groups, one group in each predetermined period, and the focus detection unit detects a focus state based on the image signals read through the first driving.

2. The image capturing apparatus according to claim 1, wherein the plurality of groups are two groups that are vertically arranged in a plan view of each pixel.

3. The image capturing apparatus according to claim 1, wherein the plurality of groups are two groups that are horizontally arranged in a plan view of each pixel.

4. The image capturing apparatus according to claim 1, wherein the plurality of groups are two groups, and in a plan view of each pixel, the photoelectric converters included in one group are vertically arranged with the center of the pixel therebetween, and the photoelectric converters included in the other group are horizontally arranged with the center of the pixel therebetween.

5. The image capturing apparatus according to claim 1, wherein the driving unit drives the image sensor with the first driving or second driving whereby image signals are read from all the plurality of photoelectric converters in the each predetermined period, and switches between the first driving and the second driving in accordance with a condition of the subject based on at least one of luminance levels of image signals acquired from the image sensor, charge accumulation periods for the image sensor, gain settings of the image capturing apparatus, a diaphragm of the optical system, movement of the subject, and movement of the image capturing apparatus.

6. The image capturing apparatus according to claim 5, wherein the driving unit switches to the first driving when luminance of the subject falls below a predetermined first threshold value while driving the image sensor with the second driving, and switches to the second driving when luminance of the subject exceeds a predetermined second threshold value that is greater than the first threshold value while driving the image sensor with the first driving.

7. The image capturing apparatus according to claim 5, wherein the driving unit switches to the first driving when a motion amount of the subject or the image capturing apparatus falls below a predetermined first threshold value while driving the image sensor with the second driving, and switches to the second driving when the motion amount exceeds a second threshold value that is greater than the first threshold value while driving the image sensor with the first driving.

8. A control method for an image capturing apparatus including an optical system configured to form an image of a subject and an image sensor that includes a plurality of pixels each having a plurality of photoelectric converters and that is capable of outputting image signals independently from the plurality of photoelectric converters, the plurality of photoelectric converters respectively receiving a plurality of luminous fluxes that have passed through areas of different exit pupils of the optical system, the control method comprising:
a driving step of driving the image sensor so that the plurality of photoelectric converters in each pixel are divided into a plurality of groups each including at least two photoelectric converters, a charge accumulation period for one group is delayed from and partially overlaps a charge accumulation period for another, and image signals are read from each of the plurality of groups, one group in each predetermined period;
a focus detection step of performing focus detection using a phase difference method based on the image signals read through the driving of the image sensor; and
an addition step of adding the read image signals on a per-pixel basis.

9. An image capturing apparatus comprising:
an optical system configured to form an image of a subject;
an image sensor that includes a plurality of pixels each having a plurality of photoelectric converters and that is capable of outputting image signals independently from the plurality of photoelectric converters, the plurality of photoelectric converters respectively receiving a plurality of luminous fluxes that have passed through areas of different exit pupils of the optical system;
a driving unit configured to control driving of the image sensor,
wherein in each pixel, the plurality of photoelectric converters are divided into a plurality of groups each including at least two photoelectric converters, a charge accumulation period for one group is delayed from and partially overlaps a charge accumulation period for another, the driving unit drives the image sensor with driving whereby image signals are read from each of the plurality of groups, one group in each predetermined period.

10. A control method for an image capturing apparatus including an optical system configured to form an image of a subject and an image sensor that includes a plurality of pixels each having a plurality of photoelectric converters and that is capable of outputting image signals independently from the plurality of photoelectric converters, the plurality of photoelectric converters respectively receiving a plurality of luminous fluxes that have passed through areas of different exit pupils of the optical system, the control method comprising:

a driving step of driving the image sensor so that the plurality of photoelectric converters in each pixel are divided into a plurality of groups each including at least two photoelectric converters, a charge accumulation period for one group is delayed from and partially overlaps a charge accumulation period for another, and image signals are read in order from each of the plurality of groups, one group in each predetermined period.

* * * * *